Patented Jan. 2, 1934

1,941,710

UNITED STATES PATENT OFFICE 1,941,710

COMPOSITION CONTAINING DERIVATIVES OF CELLULOSE

William Henry Moss, Cumberland, Md., assignor to Celanese Corporation of America, a corporation of Delaware No Drawing. Application November 7, 1929
Serial No. 405,538

9 Claims. (Cl. 106—40)

This invention relates to the preparation of compositions containing derivatives of cellulose, and relates more particularly to such compositions wherein a new plastifier or softening agent is used.

An object of my invention is to prepare compositions such as plastic or liquid coating compositions containing derivatives of cellulose wherein a dihydroxy-benzophenone is employed as a plastifier. Other objects of my invention will appear from the following detailed description.

I have found that any of the dihydroxy-benzophenones are capable of forming solutions with derivatives of cellulose and are an excellent plastifier, softening agent, or camphor substitute for use in conjunction with derivatives of cellulose to impart softness, pliability and other desirable properties to plastics, films, textiles and other materials containing derivatives of cellulose.

In accordance with my invention I prepare compositions containing derivatives of cellulose and a dihydroxy-benzophenone $(C_6H_4OH)_2CO$, as plastifier or softening agent.

Any suitable dihydroxy benzophenone having the general formula $(C_6H_4OH)_2CO$ may be employed in this invention. However, I prefer the 4,4' or p,p', and more particularly the 2,4' or o,p' dihydroxy benzophenone. The dihydroxy benzophenone may be made in any suitable manner as is known in the art.

Any suitable derivative of cellulose may be employed in conjunction with the dihydroxy benzophenone, such as cellulose nitrate but I prefer to employ organic derivatives of cellulose, such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

Plastic compositions containing the derivative of cellulose and the dihydroxy benzophenone may be made in any suitable manner and they may be worked up into sheets, rods, tubes, blocks or any other desired shape. Molding powder containing the derivative of cellulose and the dihydroxy benzophenone in intimate association but containing little or no solvent may be made, and these powders may be molded under heat and pressure to any desired shape. Filaments, yarns and other textile materials may be made from solutions containing the organic derivative of cellulose and the dihydroxy benzophenone by extrusion through orifices into an evaporative atmosphere, as in dry spinning, or into a precipitating bath as in wet spinning.

Solutions of the organic derivative of cellulose and the dihydroxy benzophenone in a volatile solvent may be cast or extruded onto a smooth surface and the volatile solvent permitted to evaporate to form films that may be used for photographic or other purposes. An important application of this invention is in the preparation of laminated glass wherein a plastic sheet containing the derivative of cellulose and the dihydroxy benzophenone is interposed between sheets of glass. Coating compositions such as lacquers may be formed containing the derivative of cellulose and the dihydroxy benzophenone dissolved in appropriate solvent mixtures, and resins, either synthetic or natural, compatible with the derivative of cellulose may be added thereto.

The proportion of the dihydroxy benzophenone to the derivative of cellulose may be varied in accordance with the particular requirements. Generally I have found that in the case of its use with cellulose acetate, the dihydroxy benzophenone may be employed in amounts of 25 or less to 150% or more of the weight of the cellulose acetate.

In making the compositions in accordance with my invention, the dihydroxy benzophenone may be employed as the sole plastifying agent, or it may be used in conjunction with other plastifiers such as triacetine, dibenzyl tartrate, diethyl tartrate, dibutyl tartrate, diethyl phthalate, etc.

In making these compositions, solvents of appropriate nature, such as acetone, methyl acetate, ethyl lactate, diacetone alcohol, of varying boiling points may be used to suit the particular requirements. Effect materials such as pigments, filling materials or dyes may be added to produce any desired effect.

In order further to illustrate my invention but without being limited thereto, the following specific examples are given.

Example I

A coating composition may be made as follows:

| | Parts by weight |
|---|---|
| Cellulose acetate | 20 |
| Dihydroxy benzophenone | 10 |
| Acetone | 200 |

*Example II*

The following is an example of a lacquer:

| | Parts by weight |
|---|---|
| Cellulose acetate | 20 |
| 2,4' dihydroxy benzophenone | 10 |
| Synthetic resin of diphenylolformaldehyde type | 25 |
| Acetone | 100 |
| Alcohol | 20 |
| Benzene | 50 |
| Diacetone alcohol | 30 |

It is to be understood that the foregoing detailed description is given merely by way of illustration, and that many variations may be made therein without departing from the spirit of my invention.

Having described my invention, what I claim and desired to secure by Letters Patent is:

1. A composition of matter containing an organic derivative of cellulose and a dihydroxy benzophenone.

2. A composition of matter containing cellulose acetate and a dihydroxy benzophenone.

3. A plastic composition containing an organic derivative of cellulose and a dihydroxy benzophenone in amounts sufficient to impart desired plasticity thereto.

4. A plastic composition containing cellulose acetate and a dihydroxy benzophenone in amounts sufficient to impart desired plasticity thereto.

5. A composition of matter containing an organic derivative of cellulose and a hydroxy-benzophenone of the formula $(C_6H_4OH)_2CO$.

6. A composition of matter containing cellulose acetate and a hydroxy-benzophenone of the formula $(C_6H_4OH)_2CO$.

7. A composition of matter containing an organic derivative of cellulose and 2.4'-dihydroxy-benzophenone.

8. A composition of matter containing cellulose acetate and 2.4'-dihydroxy-benzophenone.

9. A composition of matter containing cellulose acetate and 4.4'-dihydroxy-benzophenone.

WILLIAM HENRY MOSS.